United States Patent
Zhou et al.

(10) Patent No.: US 6,569,556 B2
(45) Date of Patent: May 27, 2003

(54) COOLING SYSTEM FOR A BATTERY PACK

(75) Inventors: Shijian Zhou, Carmel, IN (US); Jeffrey C. Waters, Indianapolis, IN (US); David R. Price, Indianapolis, IN (US); Robert L. Stinefield, Alexandria, IN (US)

(73) Assignee: General Motors Corporation, Detroit, MI (US)

( * ) Notice: Subject to any disclaimer, the term of this patent is extended or adjusted under 35 U.S.C. 154(b) by 180 days.

(21) Appl. No.: 09/771,058

(22) Filed: Jan. 29, 2001

(65) Prior Publication Data

US 2002/0102454 A1 Aug. 1, 2002

(51) Int. Cl.[7] .......................... H01M 2/12; H01M 10/50
(52) U.S. Cl. .......................... 429/88; 429/120; 429/148
(58) Field of Search .......................... 429/62, 88, 120, 429/156, 148, 71, 99; 180/68.5

(56) References Cited

U.S. PATENT DOCUMENTS

| | | | | |
|---|---|---|---|---|
| 3,745,048 A | * | 7/1973 | Dinkler et al. | 429/120 |
| 4,468,440 A | * | 8/1984 | Evjen | 429/120 |
| 5,369,571 A | * | 11/1994 | Metts | 705/10 |
| 5,456,994 A | * | 10/1995 | Mita | 429/120 |
| 5,490,572 A | * | 2/1996 | Tajiri et al. | 180/65.1 |
| 5,585,204 A | * | 12/1996 | Oshida et al. | 429/120 |

FOREIGN PATENT DOCUMENTS

DE          32 24 161 A1 * 12/1983 .......... H01M/10/50

* cited by examiner

Primary Examiner—Patrick Ryan
Assistant Examiner—Gregg Cantelmo
(74) Attorney, Agent, or Firm—Christopher DeVries

(57) ABSTRACT

A battery pack for an electric/hybrid vehicle including a cooling system that provides a substantially uniform cooling of the batteries within the pack. The battery pack includes a base that supports the batteries stacked in layers one atop the other. Each battery includes a plurality of cells with cooling air channels between them. A retention frame overlays and is affixed to the batteries to restrict the movement of the batteries within the pack. The batteries are held in spacers disposed above and below each layer of batteries. The spacers provide air passages above and below the batteries to allow cool air to flow across the batteries and through the cooling channels. An inlet admits cool air into the pack and an outlet releases the air from the pack after it is has passed through the stack of batteries. A front manifold is connected to the inlet and includes a plurality of separate runners for evenly splitting the air between the spacers below each layer of batteries. A back manifold directs air from the spacers above each layer of batteries toward the outlet of the pack.

8 Claims, 7 Drawing Sheets

COOLING SYSTEM FOR A BATTERY PACK

TECHNICAL FIELD

This invention relates to battery packs for electric/hybrid vehicles and, more particularly, to a cooling system for a battery pack that provides a substantially uniform cooling of the batteries within the pack by providing a controlled airflow path.

BACKGROUND OF THE INVENTION

It is well known in the art of electric/hybrid vehicles to provide a battery pack that includes a number of individual batteries to provide the necessary energy to drive the vehicle. When such a battery pack is charged or discharged, heat is produced which, if uncontrolled, can have a significant impact on the life and performance of the pack as a whole as well as the individual batteries that form the pack. Maintaining the temperature of the batteries, individually and as a group, within a defined operating range is essential in maximizing the performance and longevity of the battery pack.

To maintain the batteries at a desired temperature, a cooling system is provided within the pack. Conventionally, cooling systems consisted of passing cool air only over the external surfaces of the batteries. With this type of system, the air picks up heat from battery to battery and loses its cooling capacity. This arrangement inherently creates cooler battery temperatures near the inlet and hotter temperatures near the outlet. Further, the airflow is uncontrolled which also results in unbalanced airflow such that air does not flow past each battery at the same rate and same temperature. As a result, significant temperature variances can occur from one battery to the next, which is detrimental to the battery pack's performance and longevity. Therefore, it is desirable to provide a cooling system that provides a more even cooling of the batteries.

SUMMARY OF THE INVENTION

The present invention provides a battery pack for an electric/hybrid vehicle, which includes a cooling system that uniformly cools the batteries within the pack by providing a controlled airflow path. The battery pack includes a base that supports batteries that are stacked in layers one atop the other. Each battery includes individual integral cells. The batteries are held in spacers that are disposed above and below each layer of batteries. The spacers also provide air passages above and below the batteries to allow cool air to flow across the top and bottom surfaces of the batteries. A retention frame overlays and is affixed to the batteries to restrict the movement of the batteries within the pack. An inlet admits air into the pack and an outlet releases air from the pack after it is has passed through the stack of batteries. A front manifold is connected to the inlet, which includes a plurality of separate runners for evenly splitting the air between the spacers below each layer of batteries. Vertical channels are located between the cells of each battery to allow cooling air to flow between the cells from the spacers below each layer of batteries to the spacers above each layer of batteries. A back manifold directs air from the spacers above each layer of batteries toward the outlet of the pack.

In one embodiment of the present invention, the spacers above and below the batteries are divided into sections that form the rows in which the batteries are placed. Each section includes end walls and side walls which may be shared with an adjacent section. A horizontally disposed edge portion extends outwardly from the walls within each section. The bottom edges of the batteries are seated against the edge portion when the spacer is located beneath the batteries and the edge portion rests upon the top edges of the batteries when the spacer is located above the batteries, thereby creating air passages above and beneath the batteries. Also, a sheet of material is placed between the spacers to define the air passages.

The front manifold runners have a shape that tapers from one end toward an opposite end. Each runner includes slots that correspond with the air passages of the spacers below each layer of batteries. The slots confine the airflow to the air passages of the spacers below each layer of batteries.

The back manifold may also include a plurality of separate runners that taper from one end toward an opposite end. Each runner also includes slots that correspond with the air passages of the spacers above each layer of batteries and further includes baffles that are adjustable between various open and closed positions to regulate the amount of air exiting from each air passage. The air is directed to the outlet of the pack through the back manifold and then through air channels located in the base underneath the battery stack.

The above configuration essentially allows each battery to be cooled through controlled parallel paths. The air does not just flow over the top and bottom surfaces of the batteries, but also flows through the vertical channels between the cells of each battery. Such a cooling system design provides an even temperature distribution throughout the battery pack, resulting in increased life and efficiency of the batteries. An increase in battery life decreases expensive battery pack replacements during the life of a vehicle and an increase in efficiency provides larger driving ranges on a single battery pack charge. Further, the present invention also reduces cost by combining the cooling system, or air passages, with the required structural members.

These and other features and advantages of the invention will be more fully understood from the following description of a certain specific embodiment of the invention taken together with the accompanying drawings.

DESCRIPTION OF THE PREFERRED EMBODIMENT

Figure 1:
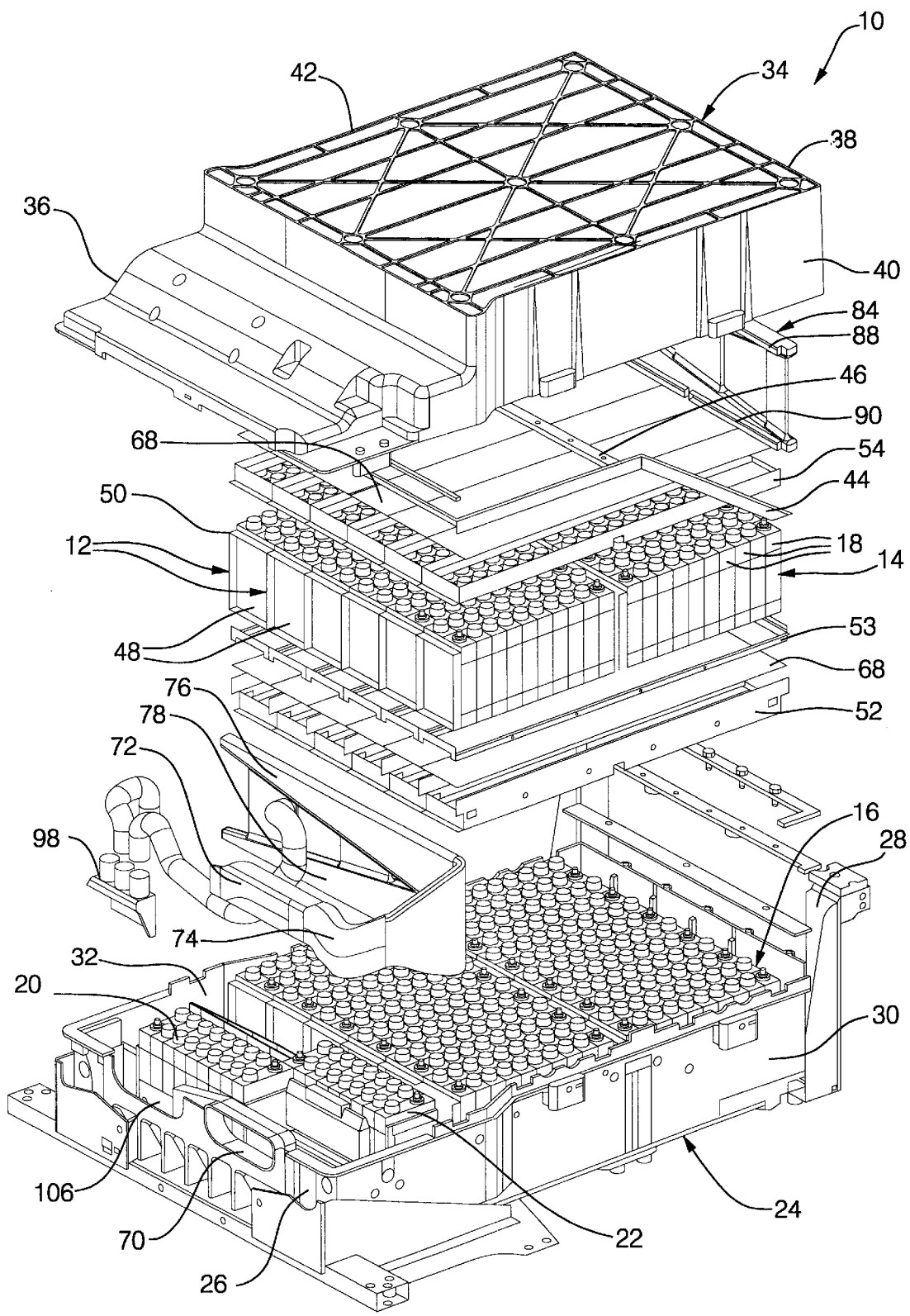
FIG. 1 is an exploded view of a battery pack in accordance with one embodiment of the present invention.

Referring now to FIG. 1 of the drawings in detail, numeral 10 generally indicates a battery pack for an electric vehicle that includes a plurality of batteries 12 electrically coupled together to provide the necessary energy/power for the vehicle's drive motor(s). The term "electric vehicle" is intended to include both "all electric" and so-called "hybrid electric" vehicles. Hybrid electric vehicles differ from "all electric" vehicles in that they also include an internal combustion engine coupled in various ways with the vehicle's electric drive system as is well known to those skilled in the art.

The batteries 12 are arranged in layers stacked one atop the other and are held in an upright orientation. In the particular embodiment shown in FIG. 1, the battery pack 10 includes upper and lower layers 14,16 of batteries, each layer 14,16 having six rows of batteries and each row containing two batteries. Each battery 12 is made up of a number of integral cells 18. Also, two batteries 20,22 are placed in front of the stack of batteries because of the limited space available in the vehicle. The stack of batteries and the two batteries 20,22 are supported on a base 24. The base 24 includes front, back, right and left walls 26,28,30,32. To completely enclose the batteries 12, a cover 34 having corresponding walls 36,38,40,42 to the base walls 26,28,30, 32 is placed on top of the base walls 26,28,30,32 and is secured to the base 24. The cover 34 may be secured to the base 24 by clamps.

Figure 2:
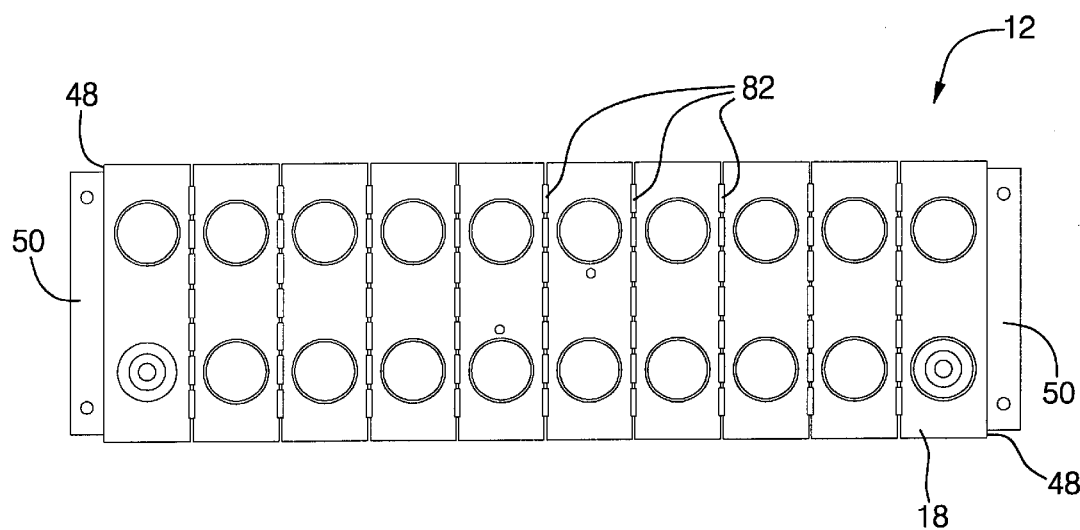
FIG. 2 is a top view of a battery.

A retention frame 44 is provided to restrict movement of the batteries 12. The frame 44 includes a plurality of beams 46 that are interconnected and extend along ends 48 of the batteries 12. In one embodiment of the invention, end brackets 50 are mounted on the ends 48 of the batteries 12 as shown in FIG. 2. The beams 46 are arranged such that they are located over the end brackets 50 of the batteries 12 when the batteries 12 are arranged in rows. The beams 46 may be secured to the end brackets 50 with fastening elements such as bolts or screws.

Figure 3:
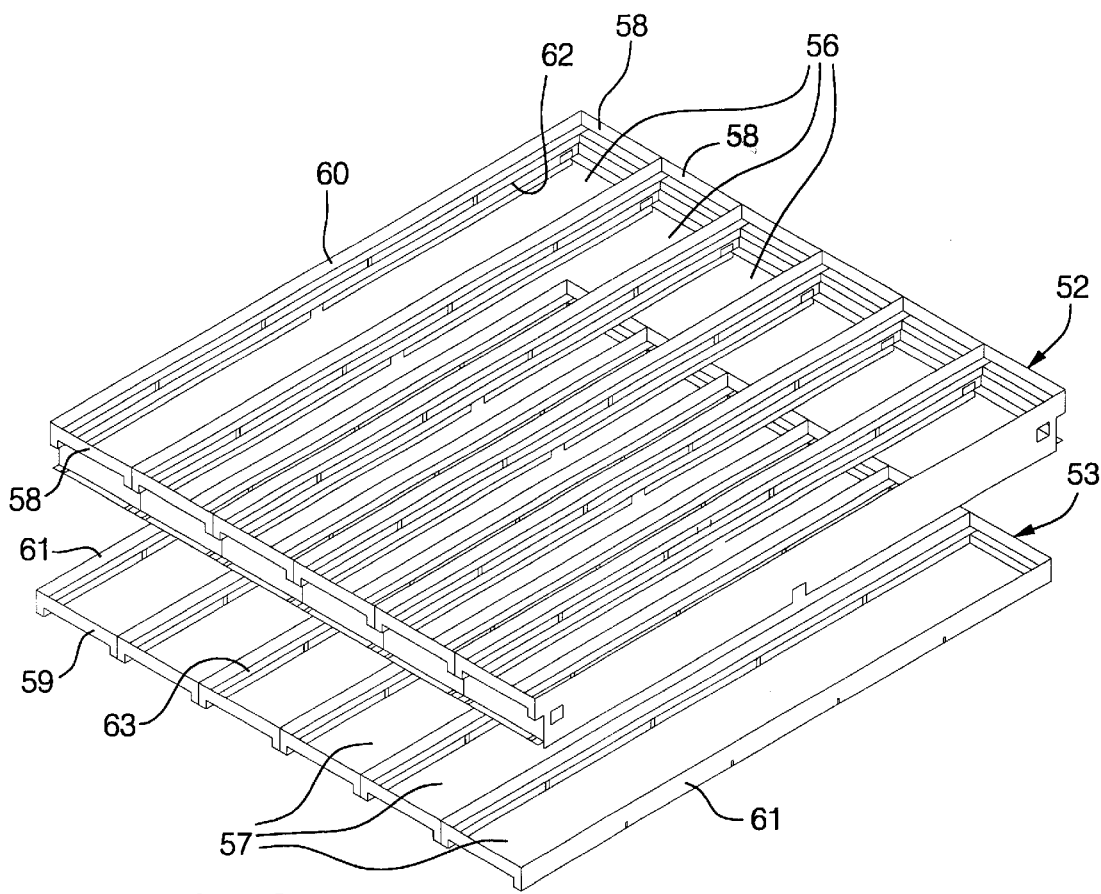
FIG. 3 is a perspective view of spacers that are located within the battery pack of FIG. 1.
Figure 4:
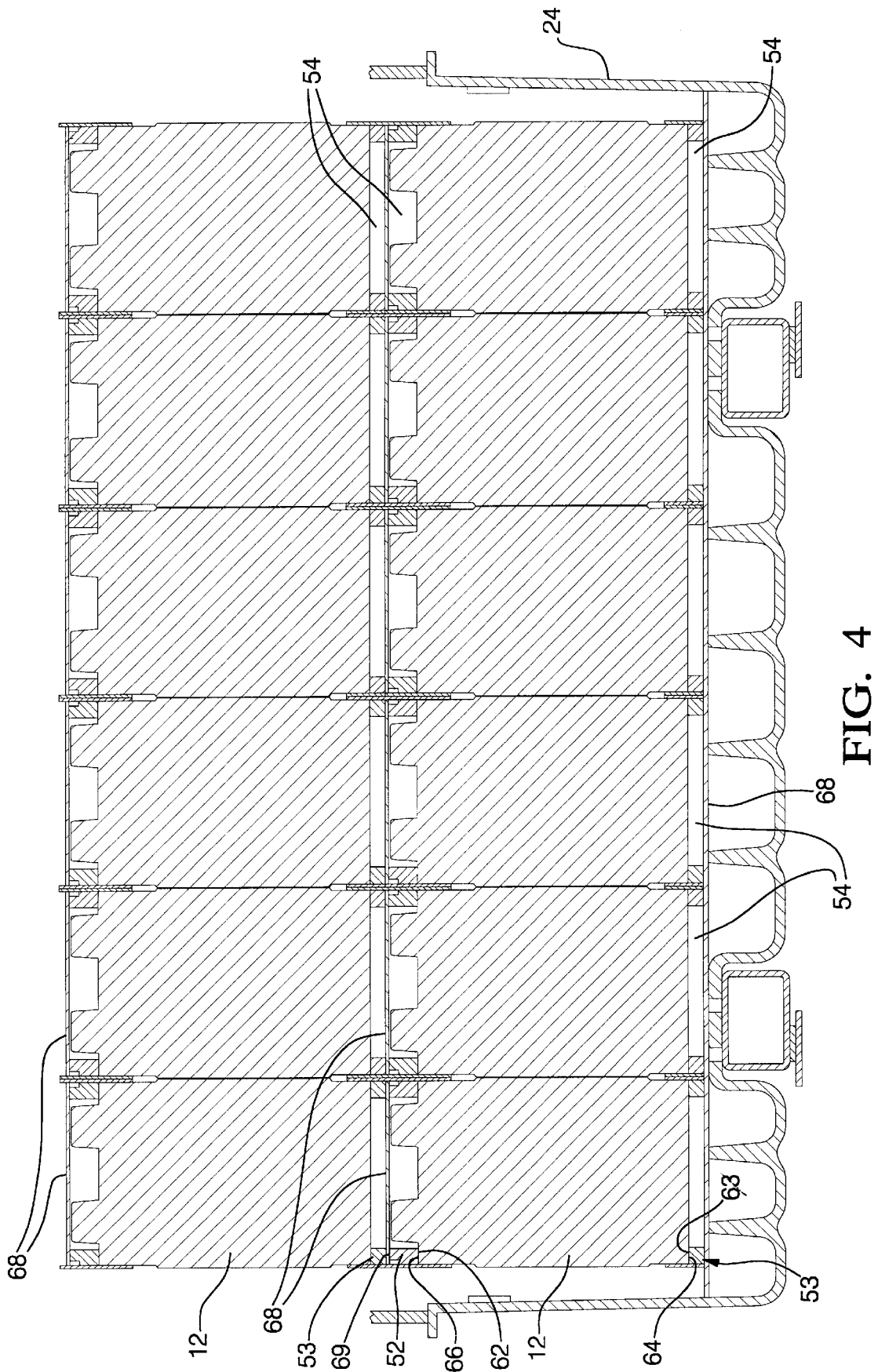
FIG. 4 is a cross-sectional end view of upper and lower layers of batteries within the battery pack.

Referring to FIGS. 3 and 4, spacers 52,53 are disposed above and below battery layers 14,16 for providing a space between layers 14,16 to allow the batteries 12 to be stacked and to provide air passages 54 above and below the batteries 12. The spacers 52,53 are divided into sections 56,57 that form the rows in which the batteries 12 are placed. Sections 56,57 include end walls 58,59 and side walls 60,61 which may be shared with an adjacent section. Horizontally disposed edge portions 62,63 extend around the inner perimeter of the walls 58,59,60,61 within sections 56,57. Bottom edges 64 of the batteries 12 are seated against the edge portion 63 of the spacer 53 and the bottom edge portion 62 of spacer 52 is seated against top edges 66 of the batteries 12. A sheet of material 68 is disposed above each spacer 52 to define air passages 54 above the batteries 12 and below the upper layer 14 of batteries. The sheet 68 rests upon a top edge portion 69 in each section 56. The cool air that flows across the top and bottom surfaces of the batteries and through the batteries 12 maintains the batteries 12 at a desired temperature.

Figure 5:
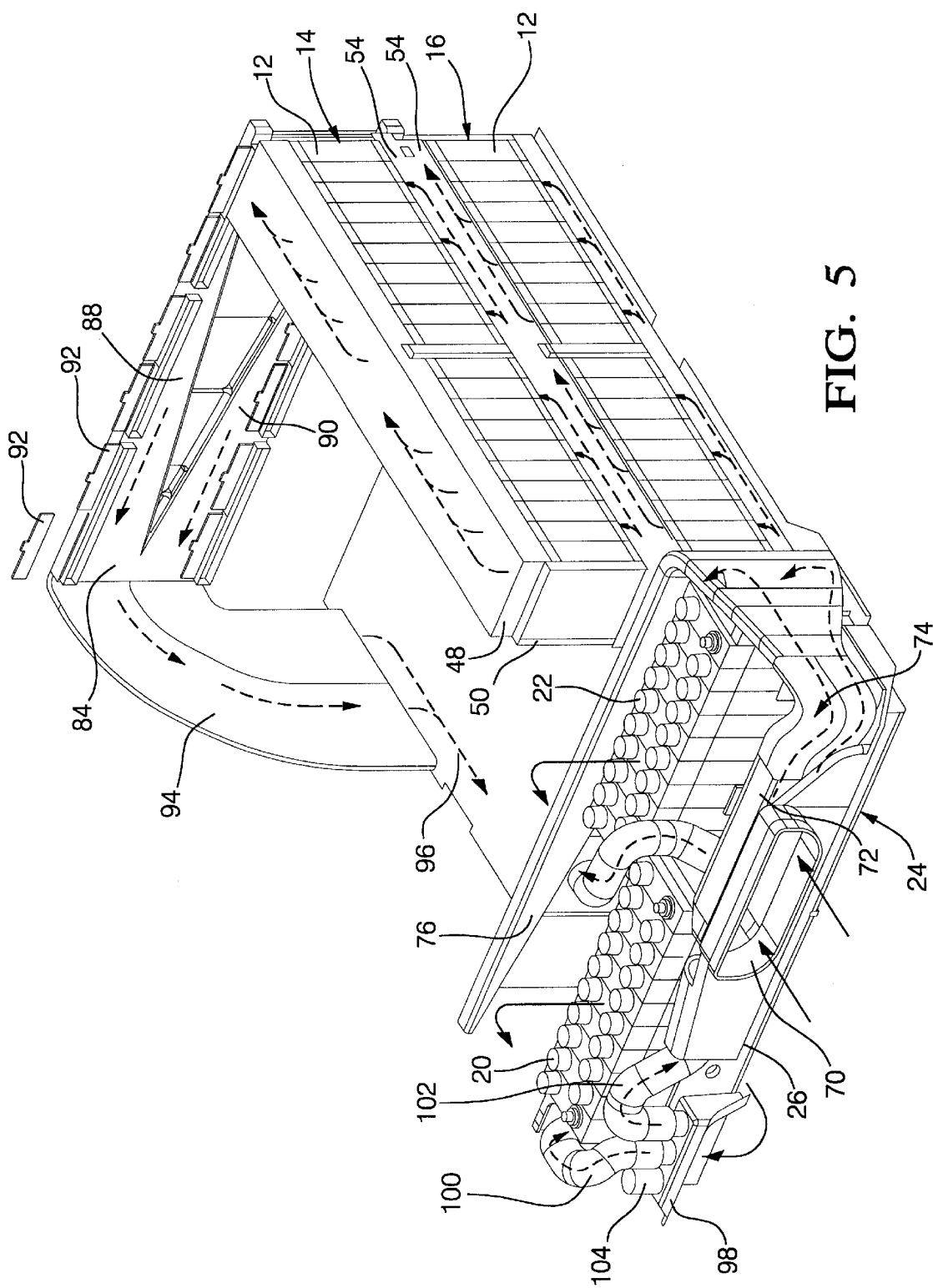
FIG. 5 is a perspective partial view of the battery pack illustrating the airflow path through the battery pack.
Figure 6:
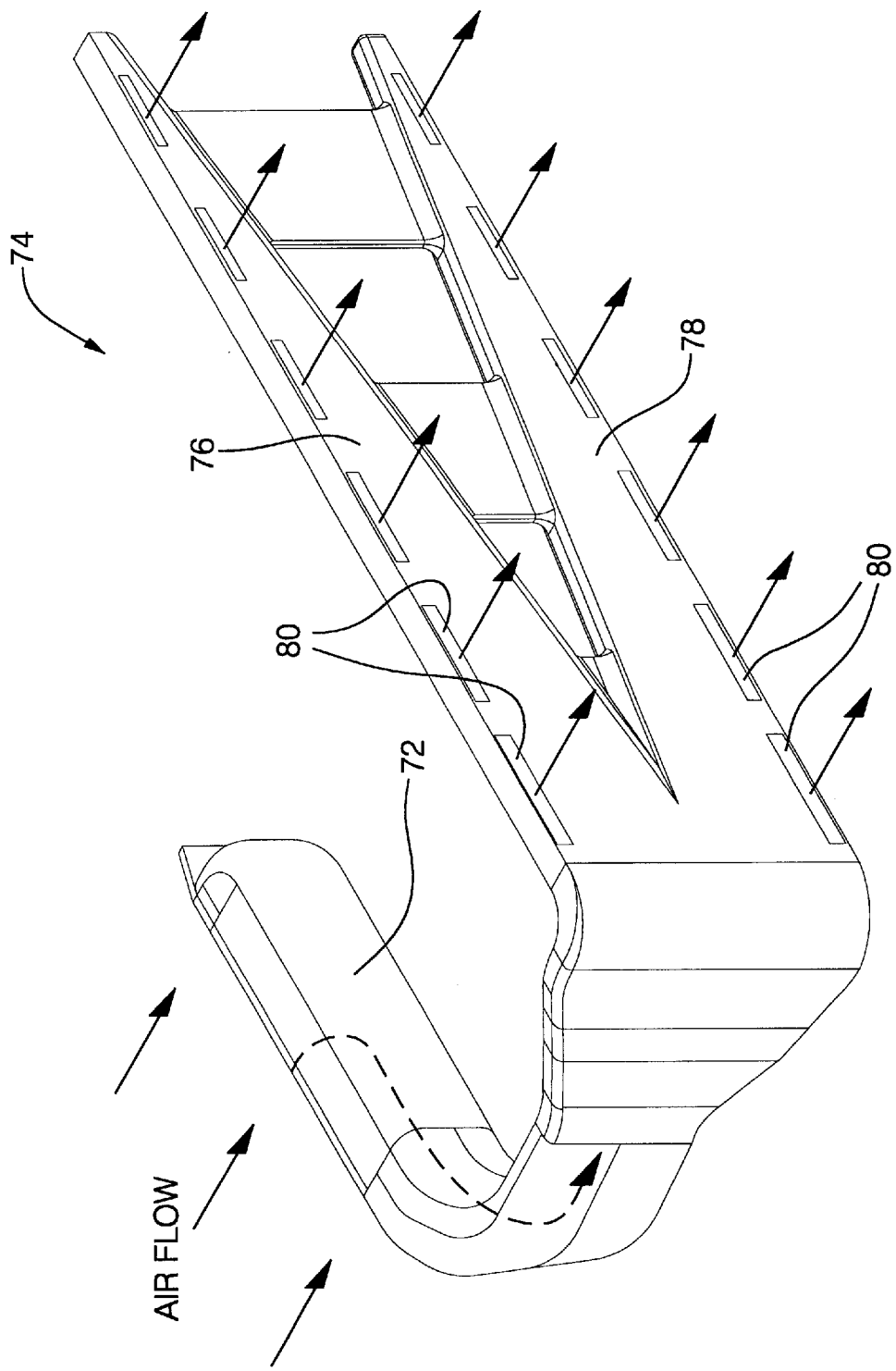
FIG. 6 is a perspective view of a front manifold.

Referring to FIGS. 1 and 5, an air inlet 70 is provided in the front wall 26 of the base 24, which is connected to an airflow source (not shown). The air enters the pack 10 through an inlet plenum 72 and immediately is forced to the right by a front manifold 74. The manifold 74 then directs the air back left towards the back of the pack 10 and finally forces the air to the left where it is split between two runners 76,78, which correspond to the upper and lower layers 14,16 of the batteries. The air enters the air passages 54 below the batteries 12 through slots 80 within each runner 76,78 as shown in FIG. 6. The number of slots 80 corresponds with the number of air passages 54 below the batteries 12. The slots 80 provide a controlled entrance for the air into the spacers 53.

Figure 7:
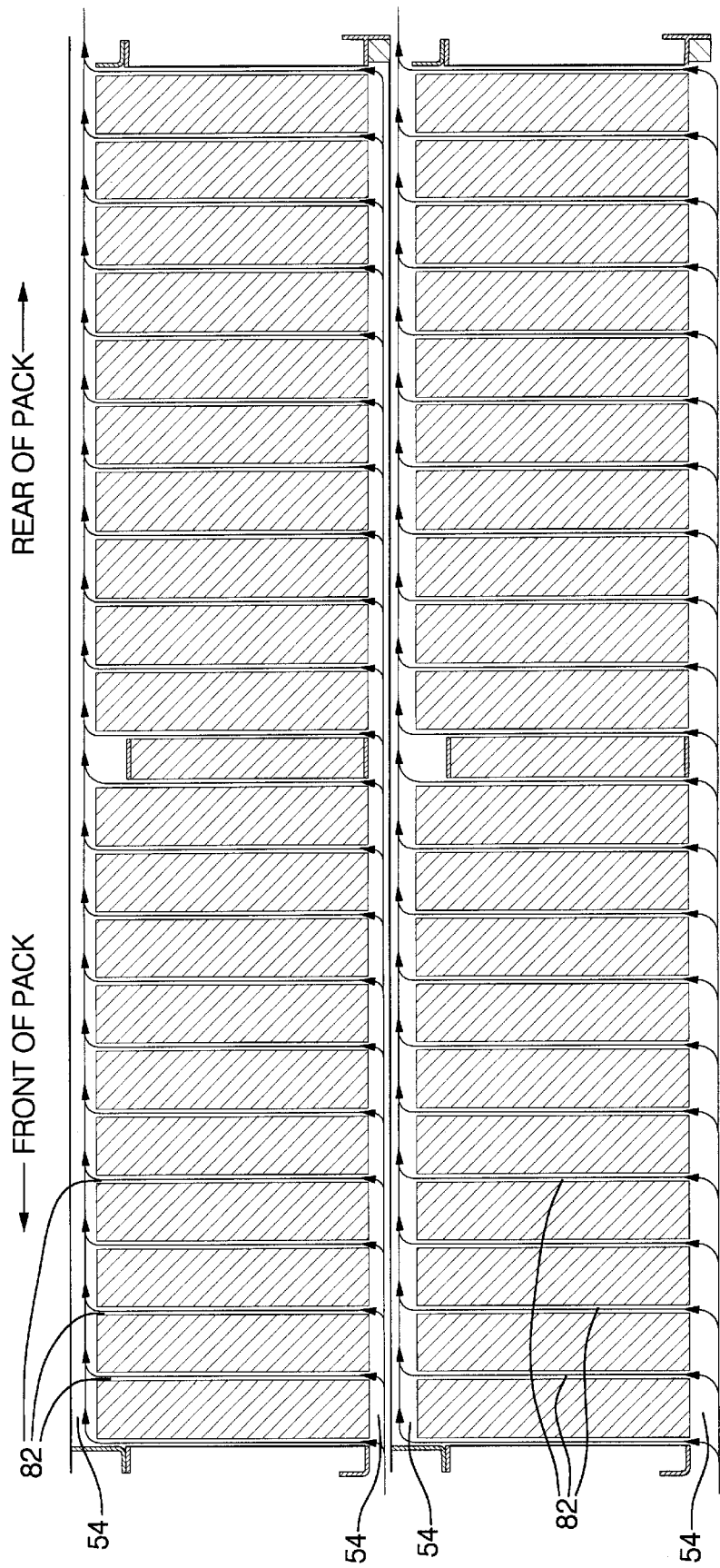
FIG. 7 is a cross-sectional side view of the batteries illustrating the airflow across and through the batteries.
Figure 8:
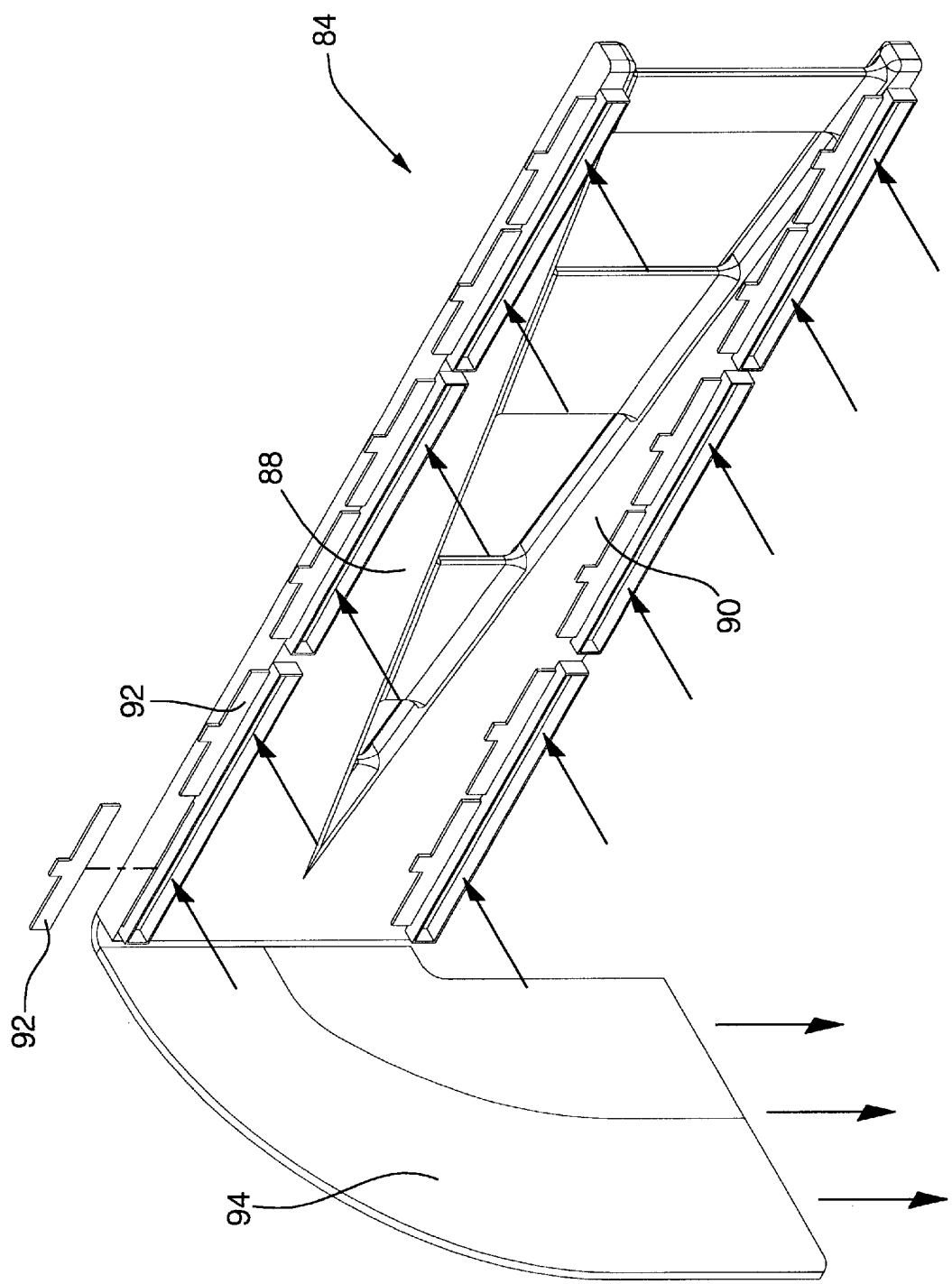
FIG. 8 is a perspective view of a back manifold.

The air is forced through the air passages 54 beneath the batteries 12 and then through vertical channels 82 between the integral cells 18 of the batteries 12 as shown in FIGS. 2 and 7. The air is directed toward the rear of the pack 10 through the air passages 54 above the batteries 12. When at the rear of the pack 10, the air enters a back manifold 84 through slots 86 of runners 88,90 as shown in FIG. 8. Again, the number of slots 86 corresponds with the number of air passages 54 above the batteries.

Referring to FIGS. 5 and 8, the back manifold 84 may include baffles 92 that are adjustable between various open and closed positions as shown in FIG. 8. The baffles 92 provide a means of controlling the amount of air exiting the air passages 54 above the batteries 12. The back manifold 84 directs the air toward the left of the pack 10 and downward through duct 94 toward air ducts 96 located in the base 24 of the pack 10. The air ducts 96 extend along the bottom of the base 24 and are connected with an outlet manifold 98 located at the front of the pack 10. The outlet manifold 98 directs air to the two front batteries 20,22 through ducts 100,102 and allows for a third exit through duct 104 directly out of the pack 10 if needed. The air is forced through vertical channels 82 of the front batteries 20,22. Finally, the air travels towards the front of the pack where it exits the pack through an air outlet 106, shown in FIG. 1.

While this invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A battery pack comprising:
    at least two stacked batteries, each battery including a plurality of cells having vertical cooling air channels therebetween;
    a base supporting said plurality of batteries;
    a retention frame overlying and affixed to each of said batteries and to said base to restrict movement of said batteries;
    a plurality of spacers disposed above and below each layer of batteries for holding said batteries and providing air passages above and below said batteries to direct air flow across top and bottom surfaces of said batteries and through said cooling air channels between the cells;
    an inlet to said pack for admitting air into said pack;
    an outlet from said pack for exhausting the air from said pack after it has passed through said stack of batteries;
    a front manifold connected to said inlet and including a plurality of separate runners for evenly splitting the air between the spacers below each layer of batteries; and
    a back manifold for directing the air from the spacers above each layer of batteries toward the outlet of said pack.

2. A battery pack as in claim 1 wherein said runners are of a shape that tapers from one end toward an opposite end.

3. A battery pack as in claim 1 wherein each runner includes slots corresponding with the air passages of the spacers below each layer of batteries.

4. A battery pack as in claim 1 wherein the back manifold includes a plurality of separate runners.

5. A battery pack as in claim 4 wherein said runners of the back manifold are of a shape that tapers from one end toward an opposite end.

6. A battery pack as in claim 4 wherein each runner of the back manifold includes slots corresponding to the air passages of the spacers above each layer of batteries.

7. A battery pack as in claim 6 wherein the runners of the back manifold include adjustable baffles to regulate the amount of air exiting through the slots.

8. A battery pack as in claim 1 wherein each spacer is divided into sections, each section having two end walls, two side walls and a horizontally disposed edge portion extending around an inner perimeter of said end and side walls, the batteries being seated on the edge portion of a spacer located beneath the batteries and being engaged by the edge portion of a spacer located above the batteries, the pack including a sheet of material disposed above each spacer that is located above the batteries to define the air passages above the batteries.

* * * * *